(12) United States Patent
Fernandez et al.

(10) Patent No.: US 8,445,809 B2
(45) Date of Patent: May 21, 2013

(54) METHOD AND APPARATUS FOR RESISTANCE SPOT WELDING

(75) Inventors: Vernon Fernandez, Rochester Hills, MI (US); Manohar Das, Rochester Hills, MI (US); Gerry Grzadzinski, Sterling Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 2485 days.

(21) Appl. No.: 11/198,046

(22) Filed: Aug. 5, 2005

(65) Prior Publication Data

US 2007/0029288 A1 Feb. 8, 2007

(51) Int. Cl.
*B23K 3/047* (2006.01)
(52) U.S. Cl.
USPC ............ 219/91.1; 219/85.22; 219/85.19; 219/89; 219/90
(58) Field of Classification Search
USPC ............ 219/86.33, 86.41, 86.51, 86.61, 86.7, 219/110
See application file for complete search history.

(56) References Cited

U.S. PATENT DOCUMENTS

| 3,445,621 | A | * | 5/1969 | Schomer ...................... 219/111 |
| 3,909,581 | A | * | 9/1975 | Stone et al. .................. 219/119 |
| 4,503,312 | A | * | 3/1985 | Nakata et al. ............. 219/86.41 |
| 4,733,042 | A | * | 3/1988 | Nishiwaki et al. ............. 219/89 |
| 4,841,113 | A | * | 6/1989 | Hamada et al. ........... 219/86.41 |
| 5,440,092 | A | | 8/1995 | Kawai |
| 6,057,523 | A | | 5/2000 | Fujii et al. |
| 6,169,263 | B1 | | 1/2001 | Derby, Jr. et al. |
| 6,294,750 | B1 | * | 9/2001 | Al-Nabulsi ................ 219/85.22 |

\* cited by examiner

*Primary Examiner* — Tu B Hoang
*Assistant Examiner* — Brian Jennison
(74) *Attorney, Agent, or Firm* — Ralph Edwin Smith

(57) ABSTRACT

A welding method and apparatus are disclosed wherein a plurality of stacks of metal sheets are clamped together in sequence at a welding site between a pair of electrode caps across which welding current is supplied to spot weld together the sheets in each of the stacks in a series of welding operations in a production run. The electrode caps are pressed against the sheets in each of the stacks when each of the stacks is at the welding site with an applied force that includes a closing force to clamp the sheets together in a surface-to-surface interface fit plus a predetermined interjoint force that is increased progressively throughout the production run.

6 Claims, 2 Drawing Sheets

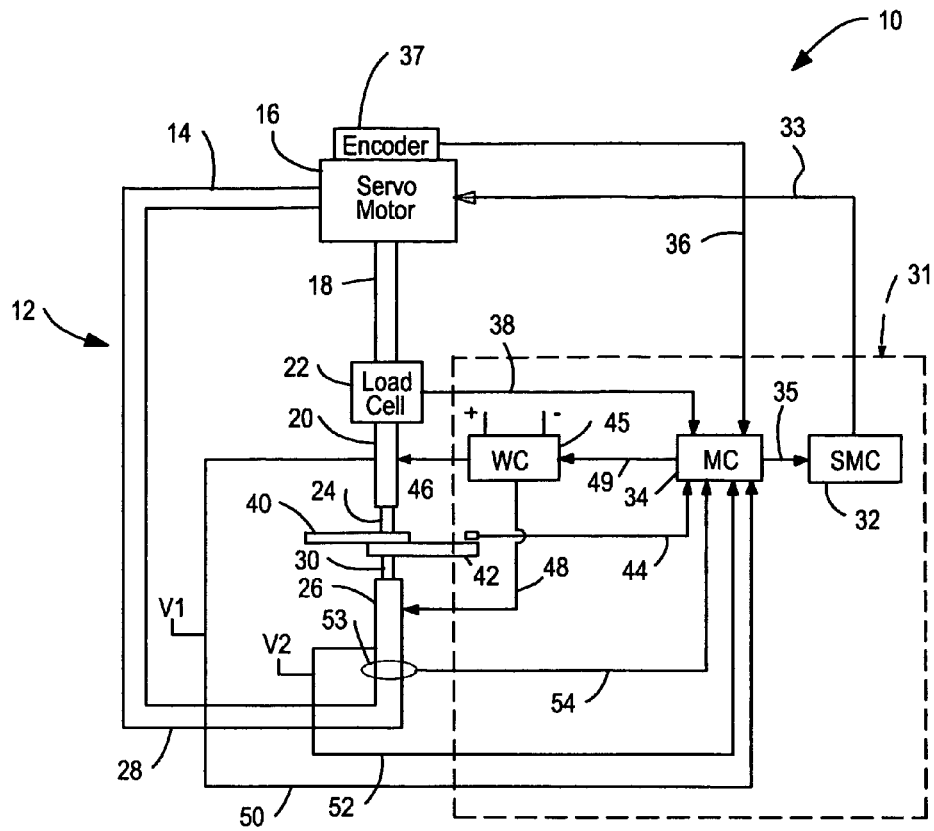
FIG. 1
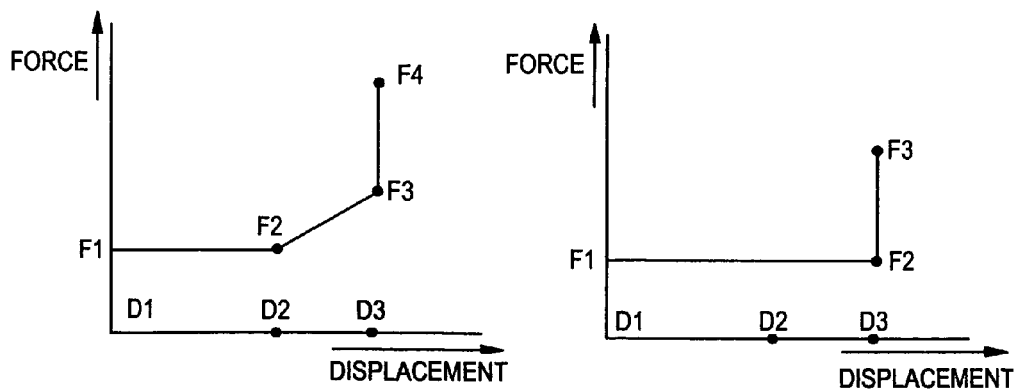
FIG. 2
FIG. 3

METHOD AND APPARATUS FOR RESISTANCE SPOT WELDING

FIELD OF THE INVENTION

The present invention relates generally to resistance spot welding.

BACKGROUND OF THE INVENTION

Spot welding is used to join parts made of sheet metal. In this process two copper electrodes have replaceable caps that press the two sheets together. Current is then passed through the electrodes and the sheet metal joint by applying a voltage across the electrodes. Due to the passing of current, resistance heating takes place in the sheet metal joint. If the current and the duration for which the current is applied is adequate to cause melting of the joint, the two sheets can be bonded together. Such a bond is referred to as a spot weld.

The variables of such joints are stack thickness, the number of interfaces and the governing metal thickness. The governing metal thickness is the thickness of the thinnest sheet in a two sheet joint. The joint variables are used to determine the process parameters, which are then programmed into a controller. The controller is thus capable of producing acceptable welds. The process parameters include current, force, time and cap size. The cap size is specified by the tip diameter.

In a typical production run in the plant, the electrode caps are changed at regular intervals since the cap tips degrade after producing a number of welds. Typically caps are changed every half a shift, or about every four hours. In a typical half shift, a given set of caps can produce as many as 6000 spot welds. The cap tip area is the area that is in contact with the sheet metal when the proper interjoint force is applied. At the start of a production run, the initial cap tip diameter may be 4.8 mm. By the end of the run the diameter may increase to 10 mm. This increase in diameter occurs due to wear and forging of the cap tips. An increase in surface area of the cap tip, reduces the interjoint pressure and current density. This change has a negative effect on the process and resulting spot weld.

SUMMARY OF THE INVENTION

In order to make a good weld, a predetermined optimum pressure must be applied to the sheets being welded. The force applied to the sheets to produce this optimum pressure is referred to herein as the interjoint force. However, because of the increase in cap diameter as the production run proceeds, it is necessary to increase the interjoint force to maintain the interjoint pressure constant. The interjoint force is increased by multiplying the recommended force by a force factor. The interjoint force can also be increased by adding a certain value of force to the force applied to the electrodes. The force factor or the additional force value as mentioned above, is computed based on the past history of the weld caps. The past history is a function of the number of welds produced and the total amount of energy delivered at a given power rate, by the set of caps. By stepping up the interjoint force based on past history, the interjoint pressure is maintained at a desirable level.

Another process deviation occurs during a production run when the sheets being welded do not have similar contours. This results in a condition called bad fitup. Fitup issues tend to reduce the interjoint force on the sheets and hence the interjoint pressure since part of the applied force is used up to force the sheets together. The force applied to the sheets, to force the sheets flat against each other and thus resolve the fitup issue is referred to as the closing force. In practice, when welding gun caps close on the sheet metal and the gun jaws stop, it is known that the sheets are together. The amount of the closing force applied at that point is recorded and added to the recommended interjoint value. Thus the interjoint pressure is maintained within its tolerance limit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a semi-diagrammatic view of apparatus for spot welding, constructed in accordance with the invention;

FIG. 2 is a force/displacement diagram for the apparatus of FIG. 1, assuming a bad fit up;

FIG. 3 is a force/displacement diagram for the apparatus of FIG. 1, assuming no fit up issue.

DETAILED DESCRIPTION OF THE PREFERRED EMBODIMENT

Figure 4:
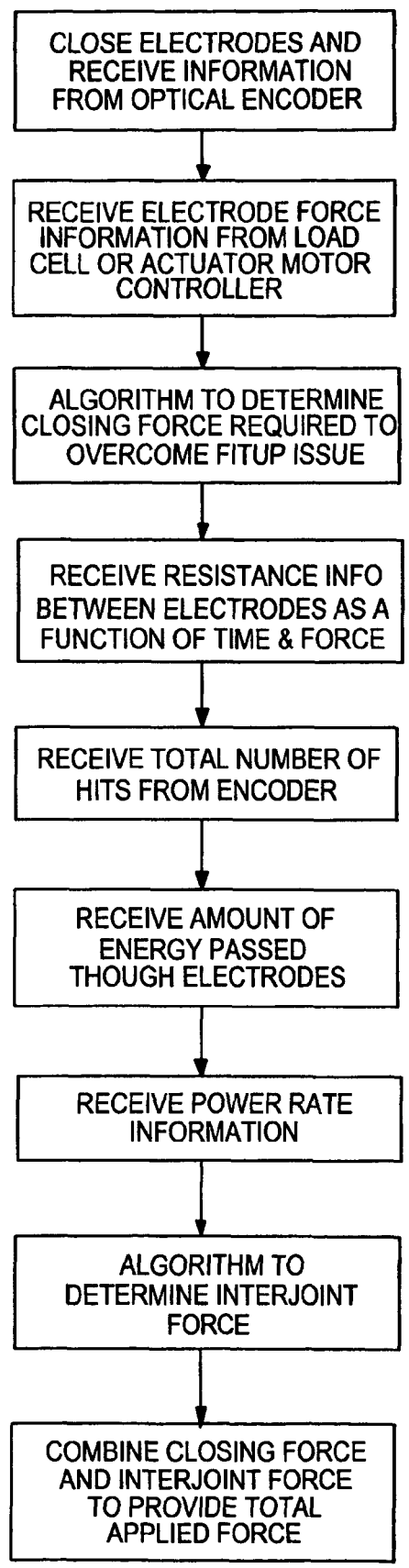
FIG. 4 is a flow chart of a procedure for practicing the invention.

The following description of the preferred embodiment is merely exemplary in nature and is in no way intended to limit the invention, its application, or uses.

Referring now more particularly to the drawings and especially to FIG. 1, there is shown a welding apparatus 10 including a frame 12 having an arm 14 rigidly supporting an actuator which, in this example, is a servo motor 16. A ball screw or roller screw drive 18 from the servo motor 16 is connected to a movable electrode 20 of copper or other suitable electrically conductive material by a load cell 22. A weld cap 24 is secured to the lower end of the movable electrode 20.

A fixed electrode 26, also of copper or other suitable electrically conductive material, is secured to an arm 28 of the frame 12 beneath the movable electrode 20. A weld cap 30 is secured to the upper end of the fixed electrode 26 in confronting relation to the weld cap 24. The servo motor 16 advances and retracts the movable electrode 20 toward and away from the fixed electrode 26 to spot weld together two or more workpieces as described hereinafter.

As part of a control mechanism 31, a servo motor controller (SMC) 32 is provided for controlling the operation of the servo motor 16 through a line 33, and a microcontroller (MC) 34 is provided for controlling the operation of the servo motor controller 32 through a line 35. Position information for the servo motor 16 is fed to the microcontroller (MC) 34 through a wire 36 from an optical encoder 37 which also serves as a counter and records the number of advances of the movable electrode 24 and hence the number of spot welds or "hits", and feeds this information to the microcontroller (MC). The load cell 22 detects the load or force on the electrode cap 24 at all times when the movable electrode 20 advances and when the two electrode caps close on the workpieces and feeds this information to the microcontroller (MC) through a line 38.

The welding apparatus 10 is constructed and arranged to spot weld together the workpieces, shown as metal sheets 40 and 42, in each of a plurality of stacks at a weld site between the electrodes in a series of welding operations in a production run. A sensor 43 signals the microcontroller (MC) 34 through the wire 44 when a stack of sheets is present at the weld site.

A weld current controller (WC) 45 is provided to direct welding current by way of wires 46 and 48 across the electrodes 20 and 26 to spot weld the sheets 40 and 42 together. Before the weld controller 44 is activated, the servo motor 16 must clamp the sheets 40 and 42 together with an applied force which includes an interjoint force needed to effect a good spot weld, and, if there is a fitup issue where the sheets do not have similar contours and are not flat against one another, a closing force to press the sheets together is added.

The weld current controller (WC) 45 supplies electrical energy in the form of voltage for a specified time to the two caps 24 and 30 of the two electrodes through the wires 46 and 48. The weld current controller (WC) is activated by the microcontroller (MC) through the wire 49. The voltages at the upper and lower electrodes 20 and 26 are transmitted to the microcontroller (MC) by the wires 50 and 52. A Rogowski coil 53, well known for detecting electric current, is placed around the electrode 26 and has a wire 54 to the microcontroller (MC) to provide the microcontroller (MC) with a voltage signal that is proportional to the amount of current passed through the electrodes. The applied current value is determined by multiplying this voltage value by the Rogowski coil constant. The Rogowski coil constant is known and is based on the physical characteristics of the Rogowski coil. The voltage and current information along with the time for which the voltage and current are applied provide the following information as measures of energy passing across the weld caps 24 and 30 and through the sheets at the spot weld:

Electrical resistance=voltage/current;

Power=voltage*current;

Energy=voltage current*time.

These parameters of energy, plus the information relative to the number of spot welds already made and as recorded by the encoder 37, are fed to the microcontroller (MC) which then computes the amount of interjoint force needed to maintain the required pressure at the weld tips during welding.

When the sheets are perfectly flat and in full surface-to-surface contact with one another, only this interjoint force needs to be considered because there is no fitup issue. However, when the sheets have different contours and are not perfectly flat and not in full surface-to-surface contact, there is a fitup issue. Therefore, an additional force, referred to as a closing force, is required to flatten the sheets and press them into a full surface-to-surface relationship.

In operation, and in reference to the flow diagram in FIG. 4, stacks of sheets 40 and 42 are clamped together in sequence at the weld site by the electrode caps 24 and 30, and an electric current is passed through the sheets to spot weld them together in a series of welding operations in a production run.

The sensor 43 signals the microcontroller (MC) 34 when a stack of sheets is present at the weld site between the weld caps, whereupon the microcontroller (MC) 34 signals the servo motor controller (SMC) 32 to supply the servo motor 16 with voltage to move the movable electrode 20 towards the fixed electrode 26. The current drawn by the servo motor 16 depends on the amount of resistance encountered by the movable electrode 20 as it moves toward the fixed electrode 30. The resistance is measured by the load cell 22 or the current drawn by the servo motor. The encoder 37 provides the microcontroller with the position information of the movable electrode 26 with respect to the fixed electrode 30.

Assuming that there is a fitup issue, in other words that the sheets have different contours, the microcontroller (MC) 34 analyzes the force versus position data and computes an algorithm to determine the amount of force, or closing force, required to press the sheets together into a full surface-to-surface relationship flat against one another. As seen in the force-displacement diagram of FIG. 2, the movable electrode 20 starts at point D1 with a corresponding force F1. At one point D2, the movable electrode 20 encounters an increase in force resistance when the cap 24 of the movable electrode 20 begins to clamp on the sheet 40. This resistance increases as the movable electrode 20 moves closer to the fixed electrode 26, until it reaches the point D3 with a corresponding force F3. At this point, the electrodes are fully closed and the sheets have been flattened out to overcome the bad fitup. The amount of force required to go from point D2 to point D3 is referred to as the closing force because it closes any gaps between the sheets and flattens them against one another.

Added force is applied, referred to as interjoint force, in order to subject the sheets to an optimum force to effect a good spot weld. The interjoint force is shown between the points F3 and F4 in FIG. 2. The amount of the interjoint force is determined by the microcontroller (MC) 34 from the historical information supplied to it from previous spot welds concerning the parameters of energy and number of spot welds made up to that time in a production run.

As previously stated, the microcontroller (MC) 34 receives from previous spot welds electrical resistance information across the electrodes as a function of time and force, and a record of voltage drop and current passing through the electrodes. From this information, the microcontroller (MC) 34 computes the amount of energy passing through the caps as well as the power rate and electrical resistance. The microcontroller develops an algorithm to determine the amount of interjoint force to be applied for the next weld and combines any closing force and the interjoint force to provide the force applied by the caps.

This historical information is cumulative whereby the amount of energy passing through the weld caps and the number of spot welds increases as the production run continues. Thus, the interjoint force will increase gradually during the production run.

FIG. 3 shows a force versus displacement curve similar to FIG. 2, but in which there is no force increase from point D2 to point D3. This happens due to the fact that the moving electrode and the fixed electrode do not encounter force resistance due to fitup issues. In this case, no closing force needs to be added to the interjoint force which is shown between points F2 and F3 because the sheets 40 and 42 are flat and, therefore, there is no fitup issue.

After the application of the applied force, the microcontroller (MC) 34 signals the weld controller 45 to direct electrical current to the electrodes to spot weld the two sheets presently at the weld site, after which the microcontroller (MC) 34 calls upon the servo motor controller 32 to retract the movable electrode.

As will be understood, the interjoint force applied to the sheets 40 and 42 is increased gradually throughout the production run. At any time during the production run, the interjoint force is a function of the number of spot welds already made, as well as a function of the electrical resistance, power and energy that has passed through the caps. Without this increase, the pressure applied to the sheets would diminish over time due to the increase in weld cap diameter as a result of wear and forging.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A welding method wherein a plurality of stacks of workpieces are clamped together in sequence at a welding site between a pair of electrode caps across which welding current is supplied to spot weld together the workpieces in each of the stacks in a series of welding operations in a production run, comprising:

pressing the electrode caps against the workpieces in each of the stacks when each of the stacks is at the welding site with an applied force that includes an interjoint force that is increased progressively throughout the production run;

wherein the interjoint force at any point in time during the production run is determined as a function of a number of spot welds made and a total amount of energy delivered at a given power rate by the electrode caps up to that point in time in the production run.

2. The welding method of claim 1, wherein the applied force also includes a closing force to clamp the workpieces together in a surface-to-surface interface fit to overcome any fitup issues.

3. Welding apparatus wherein a plurality of stacks of workpieces are clamped together in sequence at a welding site between a pair of electrode caps across which welding current is supplied to spot weld together the workpieces in each of the stacks in a series of welding operations in a production run, comprising:

an actuator for relatively advancing and retracting the electrode caps toward and away from the workpieces in each of the stacks when each of the stacks is at the welding site, and a control mechanism for the actuator to cause the actuator to clamp the electrode caps against the workpieces in each of the stacks with an applied force that includes an interjoint force that is increased progressively throughout the production run;

wherein the interjoint force at any point in time during the production run is determined as a function of a number of spot welds made and a total amount of energy delivered at a given power rate by the electrode caps up to that point in time in the production run.

4. The welding apparatus of claim 3, wherein the applied force also includes a closing force to clamp the workpieces together in a surface-to-surface interface fit to overcome any fitup issues.

5. The welding apparatus of claim 3 further comprising a counter for continuously making a count of the number of spot welds as the production run proceeds, a microcontroller for making a calculation of the amount of the interjoint force needed at any point in time based at least in part on that count, and a controller for operating the actuator based on that calculation.

6. The welding apparatus of claim 3, wherein said control mechanism includes a microcontroller, a weld controller for supplying electrical current across the electrode caps on signal from the microcontroller, the microcontroller being adapted to make a calculation of the amount of the interjoint force at any point in time during the production run, and a controller for operating the actuator based on that calculation.

* * * * *